US009329748B1

(12) United States Patent
Mitchell

(10) Patent No.: US 9,329,748 B1
(45) Date of Patent: May 3, 2016

(54) SINGLE MEDIA PLAYER SIMULTANEOUSLY INCORPORATING MULTIPLE DIFFERENT STREAMS FOR LINKED CONTENT

(71) Applicant: SnipMe, Inc., Centreville, VA (US)

(72) Inventor: Robert E. Mitchell, Centreville, VA (US)

(73) Assignee: SnipMe, Inc., Centreville, VA (US)

( * ) Notice: Subject to any disclaimer, the term of this patent is extended or adjusted under 35 U.S.C. 154(b) by 0 days.

(21) Appl. No.: 14/706,933

(22) Filed: May 7, 2015

(51) Int. Cl.
G06F 15/16 (2006.01)
G06F 3/0481 (2013.01)
G06F 3/0484 (2013.01)
G06F 3/0482 (2013.01)
H04L 29/08 (2006.01)

(52) U.S. Cl.
CPC ............ G06F 3/0481 (2013.01); G06F 3/0482 (2013.01); G06F 3/04842 (2013.01); H04L 67/02 (2013.01)

(58) Field of Classification Search
None
See application file for complete search history.

(56) References Cited

U.S. PATENT DOCUMENTS

| | | | |
|---|---|---|---|
| 5,778,181 A | 7/1998 | Hidary et al. | |
| 6,715,126 B1 | 3/2004 | Chang et al. | |
| 6,724,403 B1 | 4/2004 | Santoro et al. | |
| 6,903,779 B2 | 6/2005 | Dyer | |
| 7,027,054 B1 | 4/2006 | Cheiky et al. | |
| 7,028,264 B2 | 4/2006 | Santoro et al. | |
| 7,360,152 B2 | 4/2008 | Capps et al. | |
| 7,466,334 B1 | 12/2008 | Baba | |
| 7,543,235 B2 | 6/2009 | Novak et al. | |
| 7,941,092 B2 | 5/2011 | Rao | |
| 7,941,819 B2 | 5/2011 | Stark et al. | |
| 8,234,218 B2 | 7/2012 | Robinson et al. | |
| 8,310,443 B1 | 11/2012 | Pan | |
| 8,341,037 B2 | 12/2012 | Bachman et al. | |
| 8,359,303 B2 * | 1/2013 | Du et al. | 707/706 |
| 8,451,379 B2 | 5/2013 | Goldey et al. | |
| 8,468,562 B2 * | 6/2013 | Miller | G06Q 30/02 705/14.4 |
| 8,539,359 B2 | 9/2013 | Rapaport et al. | |
| 8,645,599 B2 | 2/2014 | Jackson et al. | |
| 8,677,284 B2 | 3/2014 | Aguilar | |

(Continued)

OTHER PUBLICATIONS

Office Action for U.S. Appl. No. 14/706,934 mailed Oct. 28, 2015.

(Continued)

*Primary Examiner* — Joshua Joo
(74) *Attorney, Agent, or Firm* — Duane S. Kobayashi

(57) ABSTRACT

In some embodiments a method includes receiving, at a mobile device, an indication of a user selection of a multimedia presentation. The multimedia presentation includes a presentation identifier that is linked to at least one video request identifier. The method includes selecting (1) a video request from a plurality of video requests based on the video request being linked to the at least one video request identifier, and (2) a multimedia category from a plurality of multimedia categories based on the multimedia category being linked to the at least one video request identifier. The method includes sending a signal to cause the mobile device to display, at a time, (1) a first portion of a user interface of the media player including at least one image from the multimedia presentation; (2) a second portion of the user interface of the media player including at least one image from the video request; and (3) a third portion of the user interface of the media player including an image representative of the multimedia category.

23 Claims, 9 Drawing Sheets

(56) References Cited

U.S. PATENT DOCUMENTS

| | | | |
|---|---|---|---|
| 8,682,809 B2 | 3/2014 | Avedissian et al. | |
| 8,700,714 B1 | 4/2014 | Pan et al. | |
| 8,732,579 B2 | 5/2014 | Rossmann et al. | |
| 8,732,605 B1 | 5/2014 | Falaki | |
| 8,756,333 B2 | 6/2014 | Jannink et al. | |
| 8,824,861 B2 | 9/2014 | Gentile et al. | |
| 2002/0042920 A1 | 4/2002 | Thomas et al. | |
| 2003/0001880 A1 | 1/2003 | Holtz et al. | |
| 2004/0154040 A1 | 8/2004 | Ellis | |
| 2006/0020962 A1 | 1/2006 | Stark et al. | |
| 2006/0184977 A1 | 8/2006 | Mueller et al. | |
| 2007/0094333 A1 | 4/2007 | Schilling et al. | |
| 2008/0270467 A1* | 10/2008 | Clarke | 707/104.1 |
| 2008/0320522 A1 | 12/2008 | Jones | |
| 2009/0037802 A1 | 2/2009 | Klier et al. | |
| 2009/0144237 A1* | 6/2009 | Branam et al. | 707/3 |
| 2009/0150369 A1* | 6/2009 | Du et al. | 707/4 |
| 2009/0216577 A1 | 8/2009 | Killebrew | |
| 2010/0172632 A1 | 7/2010 | Sakata | |
| 2010/0198697 A1 | 8/2010 | Brown | |
| 2010/0318520 A1 | 12/2010 | Loeb et al. | |
| 2010/0332497 A1* | 12/2010 | Valliani et al. | 707/759 |
| 2011/0035466 A1 | 2/2011 | Panigrahi | |
| 2011/0083074 A1 | 4/2011 | Jellison, Jr. et al. | |
| 2011/0154404 A1 | 6/2011 | Piepenbrink et al. | |
| 2011/0161485 A1 | 6/2011 | George et al. | |
| 2011/0218948 A1* | 9/2011 | De Souza et al. | 706/12 |
| 2012/0158527 A1 | 6/2012 | Cannelongo et al. | |
| 2012/0192225 A1* | 7/2012 | Harwell et al. | 725/34 |
| 2012/0278725 A1 | 11/2012 | Gordon | |
| 2013/0073388 A1 | 3/2013 | Heath | |
| 2013/0073400 A1 | 3/2013 | Heath | |
| 2013/0110929 A1 | 5/2013 | Gundotra et al. | |
| 2013/0173690 A1 | 7/2013 | Gregg et al. | |
| 2013/0179925 A1 | 7/2013 | Woods et al. | |
| 2013/0201305 A1 | 8/2013 | Sibeeas et al. | |
| 2013/0262585 A1 | 10/2013 | Niemeyer et al. | |
| 2013/0290996 A1* | 10/2013 | Davis | G06Q 30/02 725/13 |
| 2013/0294751 A1 | 11/2013 | Maeda | |
| 2014/0013230 A1 | 1/2014 | Malone | |
| 2014/0019882 A1 | 1/2014 | Chew et al. | |
| 2014/0036022 A1 | 2/2014 | Croen et al. | |
| 2014/0067828 A1 | 3/2014 | Archibong et al. | |
| 2014/0068437 A1 | 3/2014 | Dedapper | |
| 2014/0096167 A1 | 4/2014 | Lang et al. | |
| 2014/0101548 A1 | 4/2014 | Alsina et al. | |
| 2014/0109144 A1 | 4/2014 | Asnis et al. | |
| 2014/0130068 A1* | 5/2014 | Patterson et al. | 725/5 |
| 2014/0133829 A1 | 5/2014 | Howett | |
| 2014/0244859 A1 | 8/2014 | Jannink et al. | |
| 2014/0253727 A1 | 9/2014 | Sadrieh | |
| 2014/0280090 A1 | 9/2014 | Grappo | |
| 2014/0280657 A1 | 9/2014 | Miller et al. | |
| 2014/0325359 A1* | 10/2014 | Vehovsky et al. | 715/723 |
| 2014/0349750 A1 | 11/2014 | Thompson | |
| 2015/0007030 A1* | 1/2015 | Noy | 715/719 |
| 2015/0020106 A1 | 1/2015 | Belyaev | |
| 2015/0046812 A1 | 2/2015 | Darby et al. | |
| 2015/0153906 A1 | 6/2015 | Liao | |
| 2015/0365725 A1 | 12/2015 | Belyaev | |
| 2015/0379407 A1 | 12/2015 | Woon | |

OTHER PUBLICATIONS

Notice of Allowance for U.S. Appl. No. 14/706,934 mailed Mar. 9, 2016.

* cited by examiner

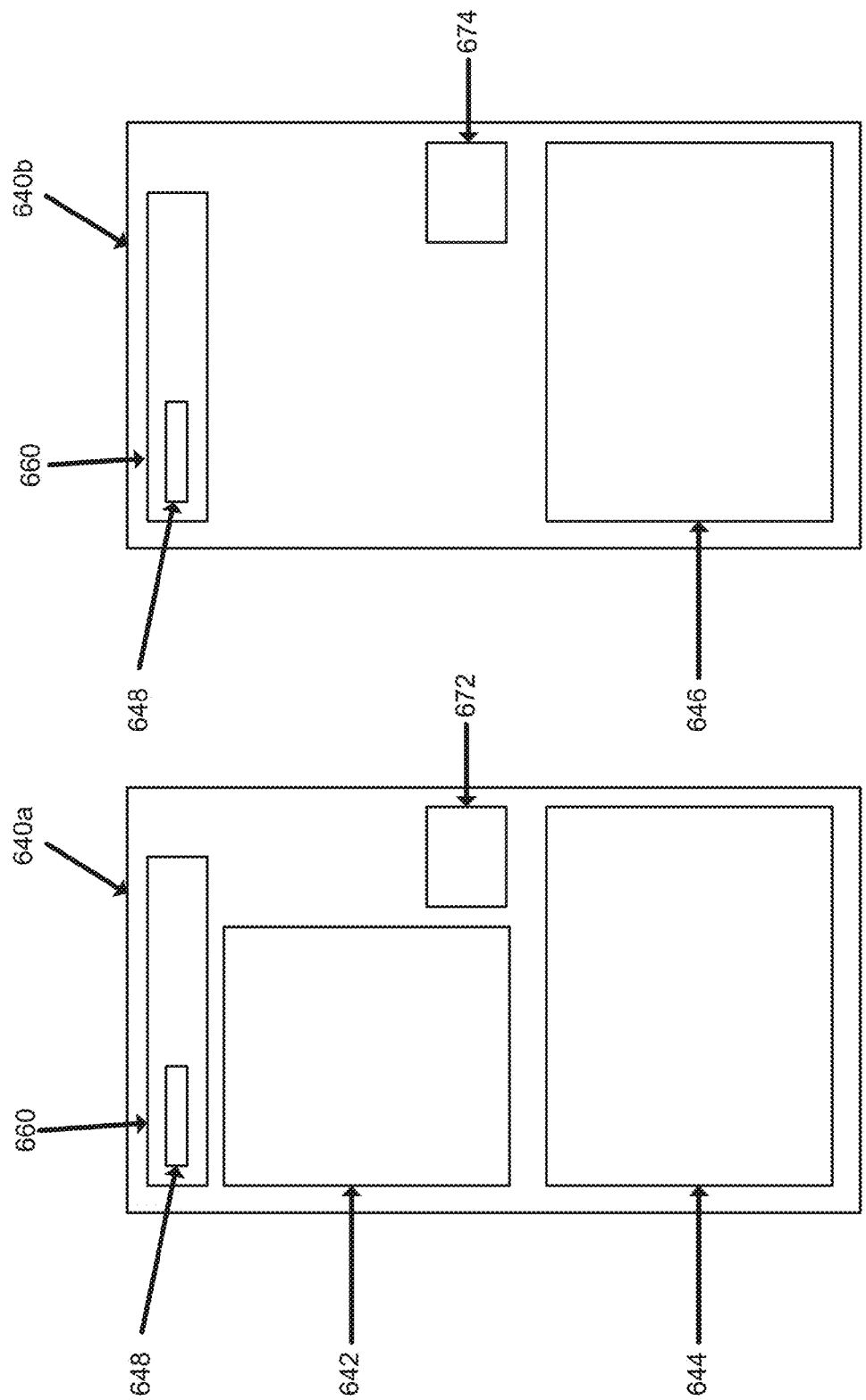

| | User ID | Campaign ID |
|---|---|---|
| Response Video 1 | 1234 | ABCD |
| Response Video 2 | 5678 | ABCD |
| Response Video 3 | 1234 | WXYZ |

FIG. 8A

| | Campaign ID | Multimedia Presentation ID(s) |
|---|---|---|
| Campaign Request 1 | ABCD | 98AB, 76DE |
| Campaign Request 2 | WXYZ | 76DE, 54FG |

FIG. 8B

SINGLE MEDIA PLAYER SIMULTANEOUSLY INCORPORATING MULTIPLE DIFFERENT STREAMS FOR LINKED CONTENT

CROSS-REFERENCE TO RELATED APPLICATIONS

This application is related to Ser. No. 14/706,934, entitled "Multi-Media Content Creation Application" filed on even date herewith, which is incorporated herein by reference in its entirety.

BACKGROUND

Some embodiments described herein relate generally to the methods and apparatus for a single media player simultaneously incorporating multiple different multimedia streams for linked content.

Traditional news/entertainment programs provide multimedia presentations of curated content from professional content providers and presented by paid professional presenters/anchors. Said another way, current news programs produce content in-house, or select third party content to present on a television or online program. Current news programs do not, however, currently produce programs that consist predominantly of curated professional quality amateur submissions that were submitted in response to a request.

Desktop based media players (e.g., Windows Media Player, etc.) and Web-based media players (e.g., Vimeo, etc.) offer a platform for professional and amateurs to produce media for public viewing. Such media, however, is not curated into a coherent program prior to presentation to the public, nor do the media players offer multiple related streams to bring together directly related content.

Accordingly, a need exists for media player that simultaneously incorporates more than one stream for linked content.

SUMMARY

In some embodiments a method includes receiving, at a mobile device, an indication of a user selection of a multimedia presentation. The multimedia presentation includes a presentation identifier that is linked to at least one video request identifier. The method includes selecting (1) a video request from a plurality of video requests based on the video request being linked to the at least one video request identifier, and (2) a multimedia category from a plurality of multimedia categories based on the multimedia category being linked to the at least one video request identifier. The method includes sending a signal to cause the mobile device to display, at a time, (1) a first portion of a user interface of a media player including at least one image from the multimedia presentation; (2) a second portion of the user interface of the media player including at least one image from the video request; and (3) a third portion of the user interface of the media player including an image representative of the multimedia category.

BRIEF DESCRIPTION OF THE DRAWINGS

FIGS. 6A and 6B are graphical representations of a user interface of the media player according to an embodiment.

FIGS. 8A and 8B depict tables included in a database coupled to a media player application according to an embodiment.

DETAILED DESCRIPTION

Figure 1:
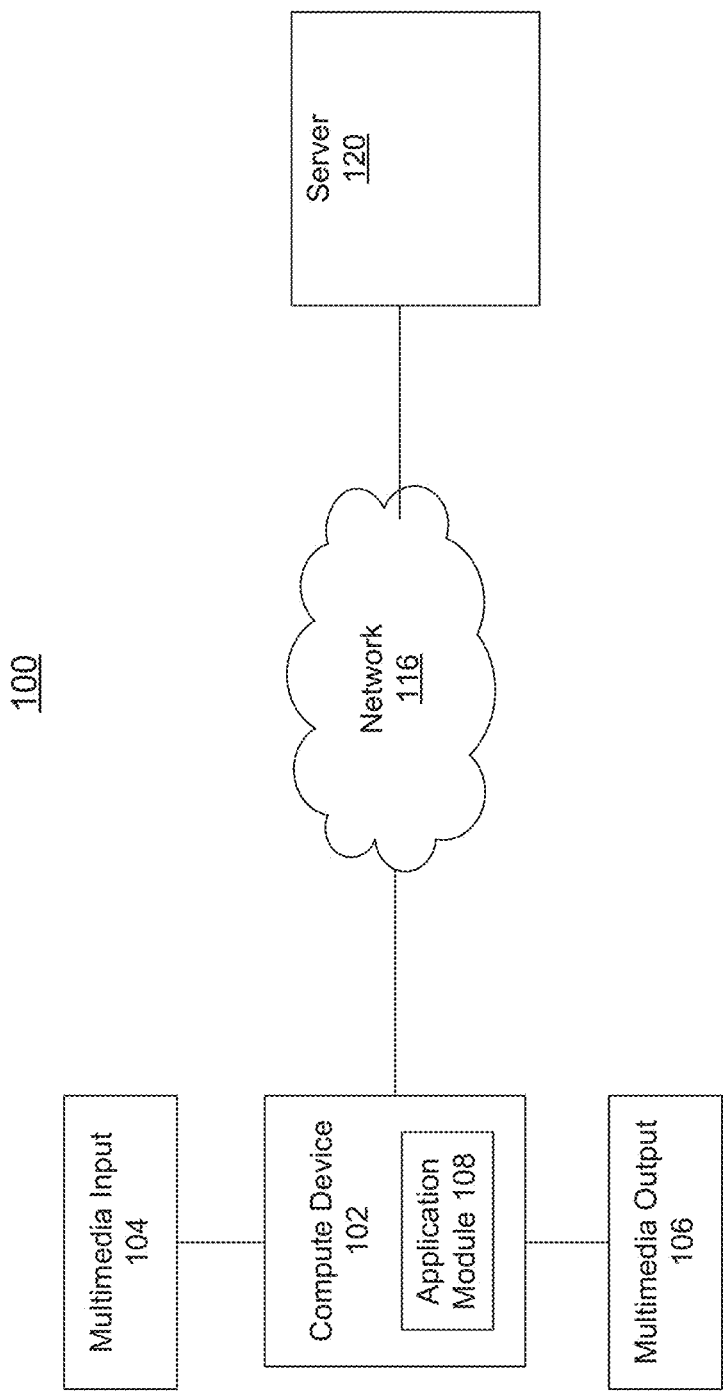
FIG. 1 is a block diagram showing a multimedia presentation system, according to an embodiment.

In some embodiments a method includes receiving, at a mobile device, an indication of a user selection of a multimedia presentation. The multimedia presentation includes a presentation identifier that is linked to at least one video request identifier. The method includes selecting (1) a video request from a plurality of video requests based on the video request being linked to the at least one video request identifier, and (2) a multimedia category from a plurality of multimedia categories based on the multimedia category being linked to the at least one video request identifier. The method includes sending a signal to cause the mobile device to display, at a time, (1) a first portion of a user interface of a media player including at least one image from the multimedia presentation; (2) a second portion of the user interface of the media player including at least one image from the video request; and (3) a third portion of the user interface of the media player including an image representative of the multimedia category.

In some embodiments, an apparatus includes a processor included within a compute device. The processor is operatively coupled to a memory, and is configured to execute an application module. The application module is configured to receive, at the compute device, an indication of a user selection of a multimedia presentation. The multimedia presentation including a presentation identifier that is linked to a video request identifier. The application module is configured to cause a display to display, during a first time period and at the compute device, (1) a first portion of a user interface of a media player including the multimedia presentation and (2) a first link associated with a second portion of the user interface of the media player. The application module is configured to cause the display to display, during a second time period different from the first time period and at the compute device, (1) a second link associated with the first portion of the user interface of the media player and (2) the second portion of the user interface of the media player including a video request that is associated with the multimedia presentation and that includes the video request identifier.

In some embodiments, a non-transitory processor-readable medium stores code representing instructions to be executed by a processor. The code comprises code to cause the processor to receive, at a compute device, an indication of a user selection of a multimedia presentation, the multimedia presentation including a presentation identifier that is linked to a video request identifier. The code comprises code to cause the processor to select a video request from a plurality of video requests based on the video request being linked to the video request identifier, and (2) a video response from a plurality of video responses based on the video response being linked to the video request identifier. The code comprises code to cause the processor to send a signal to cause the compute device to display at a time (1) a first portion of a user interface of a media player including at least one image from the multimedia presentation; (2) a second portion of the user interface of the media player including at least one image from a video request; and (3) a third portion of the user interface of the media player including at least one image from a video response including the video request identifier.

As used in this specification, a module can be, for example, any assembly and/or set of operatively-coupled electrical components associated with performing a specific function(s), and can include, for example, a memory, a processor, electrical traces, optical connectors, software (that is stored in memory and/or executing in hardware) and/or the like.

As used in this specification, the singular forms "a," "an" and "the" include plural referents unless the context clearly dictates otherwise. Thus, for example, the term "a compute device" is intended to mean a single compute device or a combination of compute devices.

As described herein, a single media player (e.g. a single webpage or single application), can simultaneously display at least two linked media sources (image, video and/or audio livestream, prerecorded multimedia, webcast, podcast, etc). The media player can be a desktop, web-based, mobile, or set-top box application. The media sources can be linked. For example, (1) a first video source that can be configured to play a campaign/topic request video, e.g., a request for a user video about a particular topic; (2) a second video source that can be configured to play a professionally produced "show" including video curated from videos submitted in response to the campaign request video associated with the first video source; and (3) a third video source that can be configured to play approved videos submitted in response to the campaign associated with the first video source, whether or not they are included in the "show" associated with the second video source, and/or other related video. This third video source can also be used to display videos submitted as comments back to a specific video submitted for the first video source and/or display videos containing biographical information about the submitter themselves. As described herein, any combination of the first video source, the second video source, and the third video source can be displayed, depending on, for example, the format of the media player, capabilities of a compute device, and/or preferences of a user. As described herein, it is apparent that the three media sources are linked, and not disparate media, e.g. not simply multiple videos that are not otherwise related to each other (like a typical news website) and are not simply multiple videos from the same user or search results (social media and/or video sharing websites and/or applications).

FIG. 1 is block diagram showing a multimedia presentation system ("system") 100 according to an embodiment. As shown in FIG. 1, the system 100 includes a compute device 102 and a server device 120 that are coupled via a network 116. Compute device 102 includes an application module 108 and is operatively coupled to a multimedia input 104 and a multimedia output 106.

The compute device 102 (e.g., a mobile compute device) and the server device 120 are in communication via the network 116. The network 116 can be any suitable network or combination of networks. For example, in some embodiments, the network 116 can be a local area network (LAN), a wide area network (WAN), a metropolitan area network (MAN), a worldwide interoperability for microwave access network (WiMAX), an intranet, the Internet, an optical fiber (or fiber optic)-based network, a virtual network, and/or any combination thereof. Moreover, at least a portion of the network 116 can be implemented as a wireless network. For example, in some embodiments, the compute device 102 can be in communication with the network 116 via a wireless access point or the like (not shown in FIG. 1) that is operably coupled to the network 116. The server device 120 can similarly be in communication with the network 160 via a wired and/or wireless connection.

The compute device 102 can be any suitable compute device. For example, in some embodiments, the compute device 102 is a mobile compute device (smartphone, tablet, laptop, etc.) that is wirelessly in communication with the network 116 and/or the server device 120. In other embodiments, compute device 102 is a desktop computer, television, set-top box, etc. The compute device 102 includes the application module 108.

Figure 2:
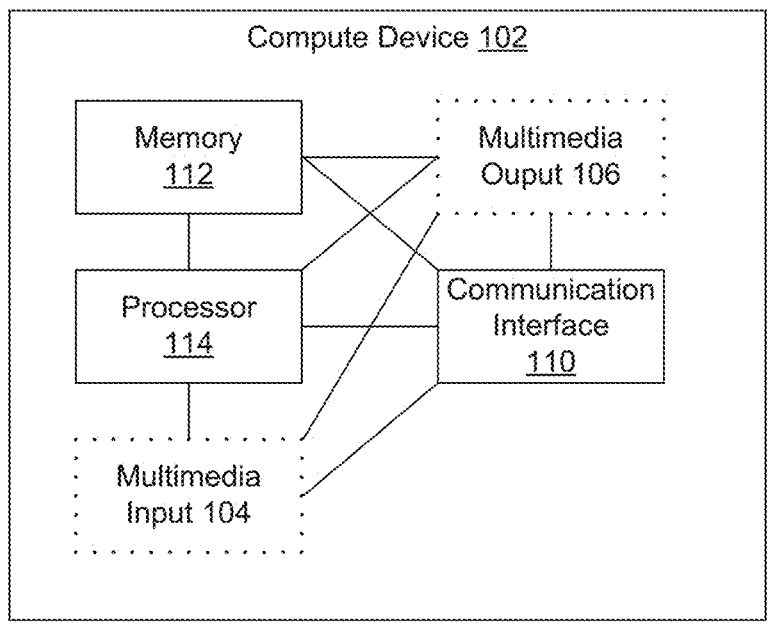
FIG. 2 is a block diagram depicting a compute device from the multimedia presentation system shown in FIG. 1.

As shown in FIG. 2, the compute device 102 includes a memory 112, a processor 114, and a communication interface 110. In some embodiments, such as, for example, as shown in FIG. 2, multimedia input 104 and multimedia output 106 can be integral with the compute device 102 (shown as dashed lines in FIG. 2, by way of example, a smartphone or tablet). In other embodiments, multimedia input 104 and multimedia output 106 can be separate from the compute device 102 (by way of example, a desktop computer). The memory 112 can be, for example, a random access memory (RAM), a memory buffer, a hard drive, a read-only memory (ROM), an erasable programmable read-only memory (EPROM), and/or the like. In some embodiments, the memory 112 can store, for example, one or more software modules and/or code, for example application module 108, which can include instructions to cause the processor 114 to perform one or more processes, functions, and/or the like. For example, in some embodiments, the memory 112 can include a software module and/or code that can include instructions to cause the processor 114 to operate a media player application and/or a multimedia content creation application. The memory 112 can further include instructions to cause the communication interface 110 to send and/or receive one or more signals associated with the input to or output from, respectively, the server device 120, as described in further detail herein.

The processor 114 can be any suitable processing device configured to run or execute a set of instructions or code such as, for example, a general purpose processor, a central processing unit (CPU), an accelerated processing unit (APU), an application specific integrated circuit (ASIC), a field programmable gate array (FPGA), and/or the like. As such, the memory 112 can store instructions, for example, application module 108, to cause the processor 114 to execute modules, processes, and/or functions associated with, for example, a media player application and/or a multimedia content creation application, as described in further detail herein.

The multimedia input 104 can be any component, subsystem, suitable device and/or combination of devices. For example, in some embodiments, the multimedia input device 104 can be an input port or the like that can be operably coupled to the memory 112 and the processor 114, as well as, for example, a camera, a haptic input device, an audio input device, an accelerometer, and/or the like (not shown in FIGS. 1 and 2). The multimedia input 104 can be configured to receive a signal (e.g., from a camera) associated with a media player application and/or a multimedia content creation application, can forward the signal and/or otherwise send another signal representing that signal to the processor 114 for any suitable processing and/or analyzing process, as described in further detail herein. In some embodiments, the multimedia input 104 can be a combination of elements, for example, a camera coupled to a microphone and/or an accelerometer.

The multimedia output 106 of the compute device 102 can be any component, subsystem, suitable device and/or combination of devices. For example, in some embodiments, the multimedia output 106 that can provide an audio-visual user interface, haptic output, etc. for the compute device 102. In some embodiments, the multimedia output 106 can be at least one display. For example, the multimedia output 106 can be a cathode ray tube (CRT) display, a liquid crystal display (LCD) display, a light emitting diode (LED) display, and/or the like. In some embodiments, the multimedia output 106 can be a speaker that can receive a signal to cause the speaker to output audible sounds such as, for example, instructions, verification questions, confirmations, etc. In other embodiments, the multimedia output device 106 can be a haptic device that can receive a signal to cause the haptic output device to vibrate at any number of different frequencies. As described in further detail herein, the multimedia output 106 can provide the user interface for a software application (e.g., mobile application, internet web browser, and/or the like). In some embodiments, the multimedia output 106 can be a combination of elements, for example, a display coupled to a speaker and/or a haptic output device.

The communication interface 110 of the compute device 102 can be any component, subsystem, suitable device that can communicate with the network 116. More specifically, the communication interface 110 can include one or more wireless interfaces, such as, for example, Ethernet interfaces, optical carrier (OC) interfaces, and/or asynchronous transfer mode (ATM) interfaces. In some embodiments, the communication interface 110 can be, for example, a network interface card and/or the like that can include at least a wireless radio (e.g., a WiFi 0 radio, a Bluetooth® radio, etc.). As such, the communication interface 110 can send signals to and/or receive signals from the server device 120.

Referring back to FIG. 1, the server device 120 can include and/or can otherwise be operably coupled to a database 126. The database 126 can be, for example, a table, a repository, a relational database, an object-oriented database, an object-relational database, a SQL database, and XML database, and/or the like. In some embodiments, the database 126 can be stored in a memory of the server device 120 and/or the like. In other embodiments, the database 126 can be stored in, for example, a network access storage device (NAS) and/or the like that is operably coupled to the server device 120. In some embodiments, the database 126 can be in communication with the server device 120 via the network 116. In such embodiments, the database 126 can communicate with the network 116 via a wired or a wireless connection. The database 126 can be configured to at least temporarily store data such as, for example, data associated with multimedia presentations. In some embodiments, at least a portion of the database 126 can be stored in, for example, the memory 112 of the compute device 102.

The server device 120 can be any type of device that can send data and/or to receive data from one or more compute devices (e.g., the compute device 102) and/or databases (e.g., the database 126) via the network 116. In some embodiments, the server device 120 can function as, for example, a server device (e.g., a web server device), a network management device, an administrator device, and/or so forth. The server device 120 can be located within a central location, distributed in multiple locations, and/or a combination thereof. Moreover, some or all of a set of components of the server device 120 can be located within a user device (e.g., the compute device 102) and/or any other device or server in communication with the network 116.

Figure 3:
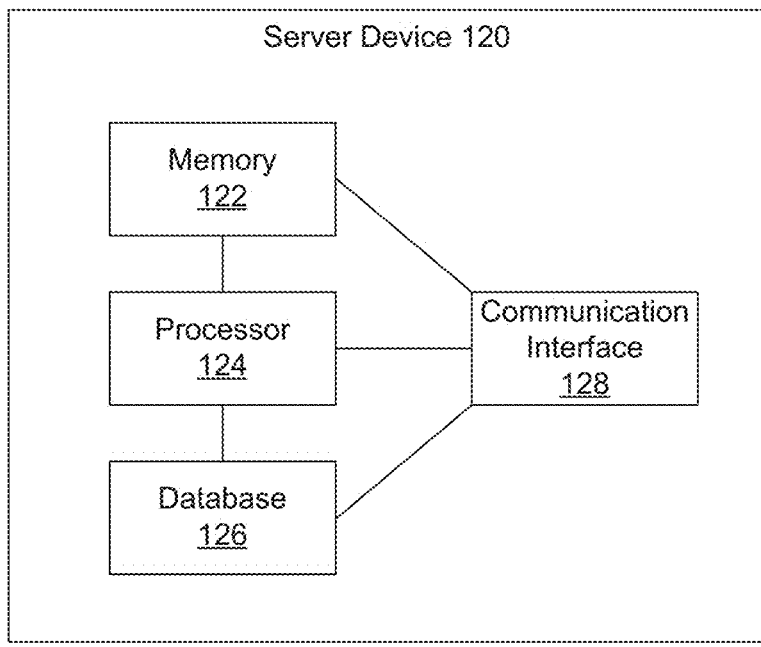
FIG. 3 is a block diagram depicting a server from the multimedia presentation system shown in FIG. 1.

As shown in FIG. 3, the server device 120 includes a communication interface 128, a memory 122, a processor 124, and the database 126. The communication interface 128 of the server device 120 can be any suitable device that can communicate with the network 116 via a wired or wireless communication. More specifically, the communication interface 128 can include one or more wired or wireless interfaces, such as, for example, Ethernet interfaces, optical carrier (OC) interfaces, and/or asynchronous transfer mode (ATM) interfaces. In some embodiments, the communication interface 128 can be, for example, an Ethernet port, a network interface card, and/or the like. In some embodiments, the communication module 128 can include a wireless radio (e.g., a WiFi® radio, a Bluetooth® radio, etc.) that can communicate with the network 116.

The memory 122 can be, for example, a random access memory (RAM), a memory buffer, a hard drive, a read-only memory (ROM), an erasable programmable read-only memory (EPROM), and/or the like. In some embodiments, the memory 122 can be configured to store, for example, one or more software modules and/or code that can include instructions to cause the processor 122 to perform one or more processes, functions, and/or the like. For example, in some embodiments, the memory 122 can include a software module and/or code that can include instructions to cause the communication interface 128 to receive and/or send one or more signals from or to, respectively, the compute device 102 (via the network 116). In some instances, the one or more signals can be associated with media player applications and/or a multimedia content creation applications, and/or the like. The memory 122 can further include instructions to cause the processor 124 to analyze, classify, compare, verify, and/or otherwise process data received from the compute device 102. In addition, the memory 122 can include instructions to cause the processor 124 to query, update, and/or access data stored in the database 126, as described in further detail herein.

The processor 124 of the server device 120 can be any suitable processing device configured to run or execute a set of instructions or code such as, for example, a general purpose processor, a central processing unit (CPU), an accelerated processing unit (APU), an application specific integrated circuit (ASIC), a field programmable gate array (FPGA), a front end processor, a network processor, and/or the like. As such, the memory 122 can store instructions to cause the processor 124 to execute modules, processes, and/or functions associated with, for example, sending and/or receiving signals via the network 120, analyzing; classifying, comparing, verifying, and/or processing data; and/or querying, updating, and/or otherwise accessing data stored in the database 126, and/or the like.

Returning to FIG. 1, the application module 108 can include instructions to cause the processor 114 to perform one or more processes, functions, and/or the like. For example, in some embodiments, the memory 112 can include a software module and/or code that can include instructions to cause the processor 114 to operate a media player application, for example, media player application 208 (see, e.g., FIGS. 4 and 5) and/or a multimedia content creation application (see, e.g., content creation applications are disclosed in Ser. No. 14/706, 934, entitled "Multi-Media Content Creation Application.")

Figure 4:
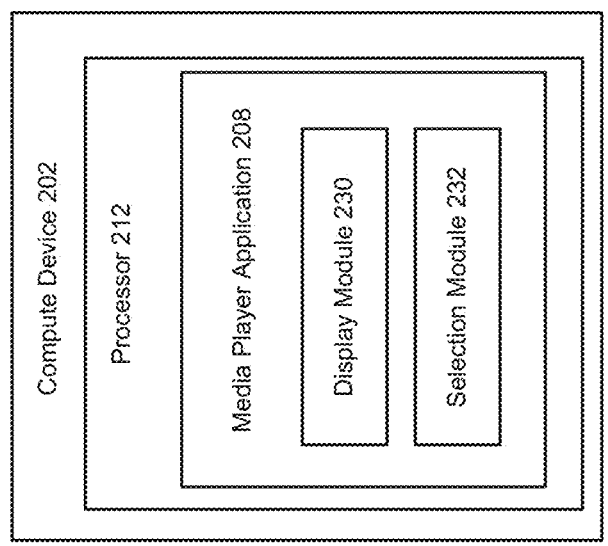
FIG. 4 is a block diagram depicting a compute device configured to execute a media player application according to an embodiment.
Figure 5A:
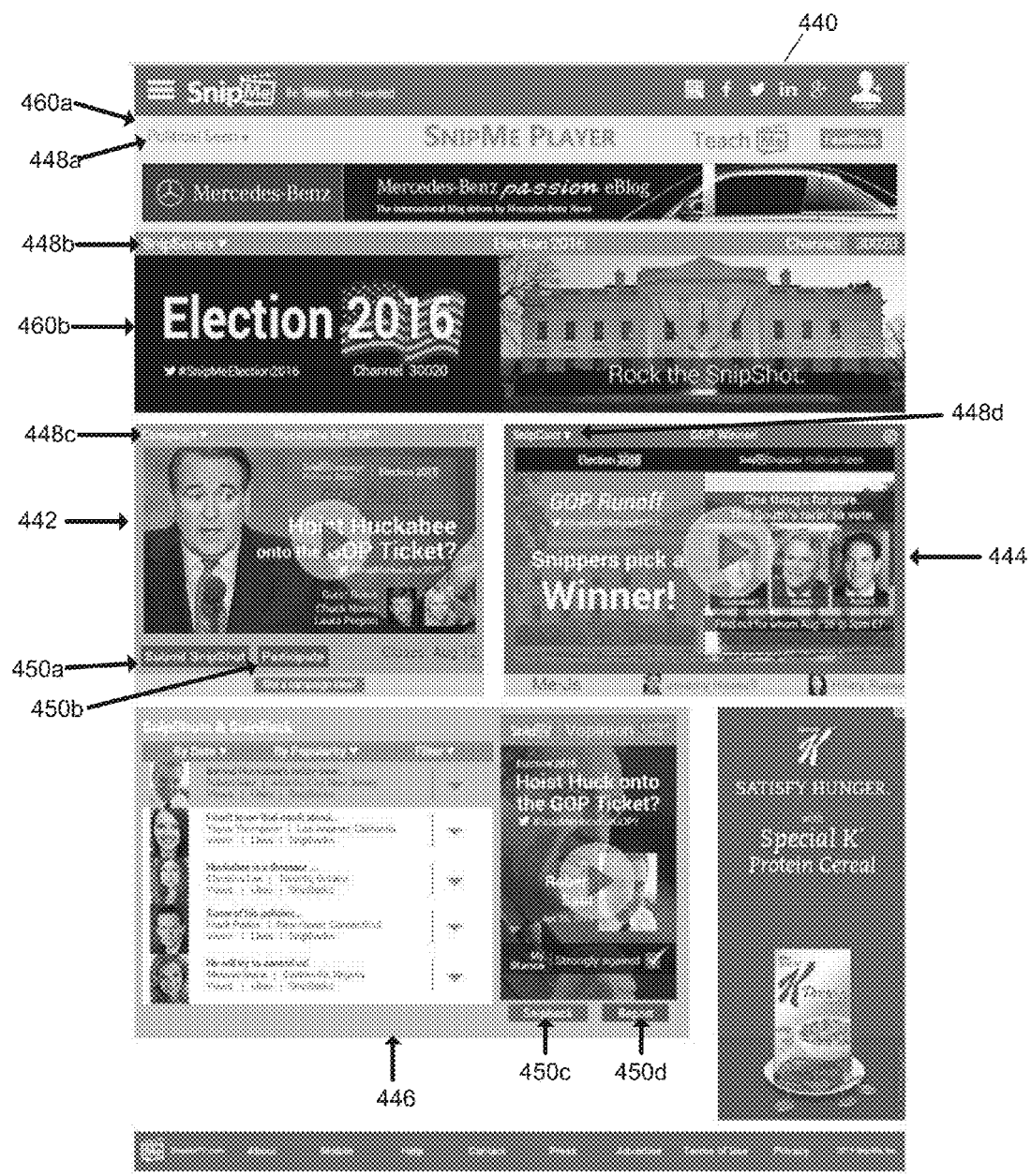
FIGS. 5A-5C are graphical representations of a user interface of the media player defined by the media player application shown in FIG. 4.
Figure 5B:
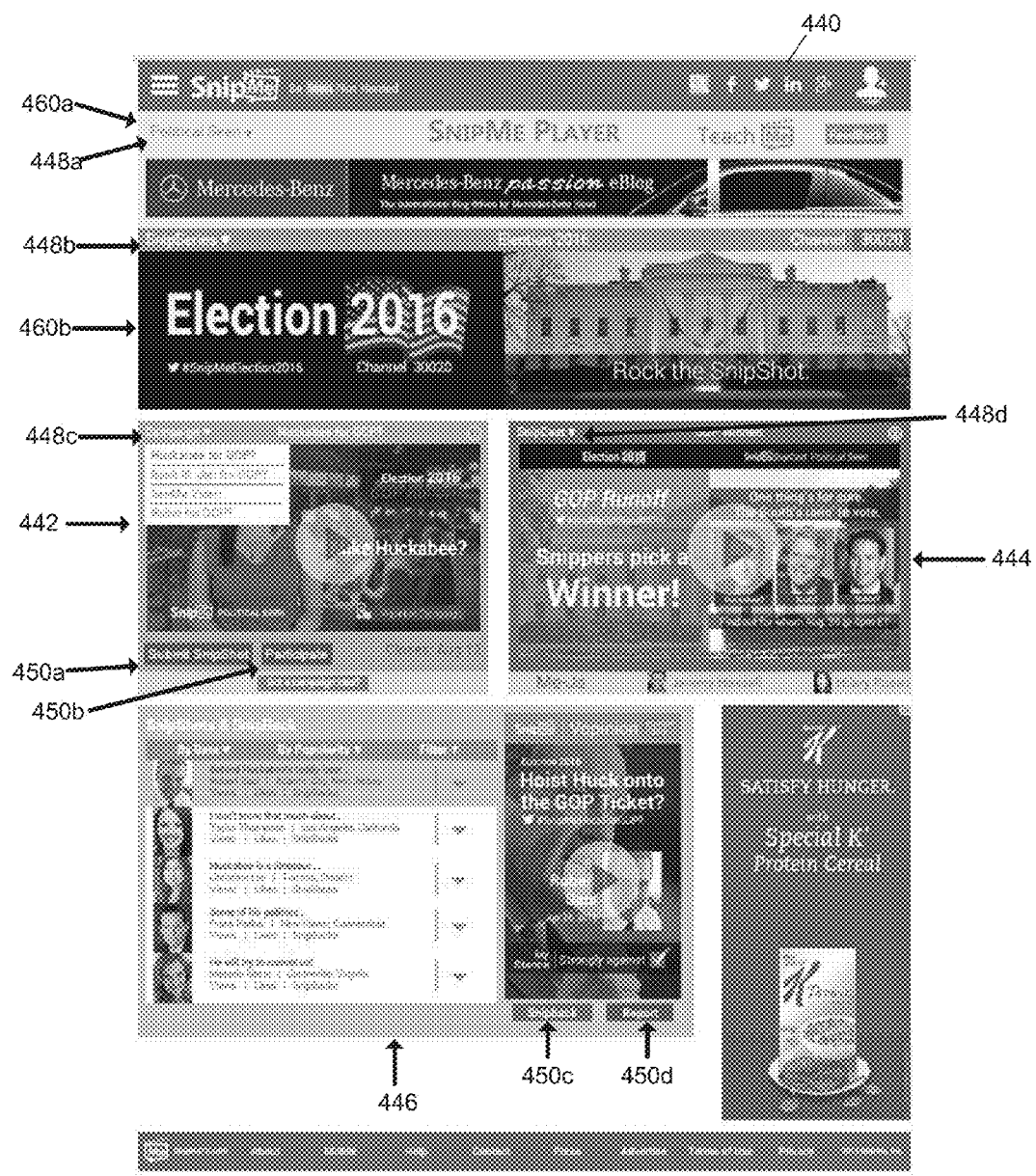
Figure 5C:
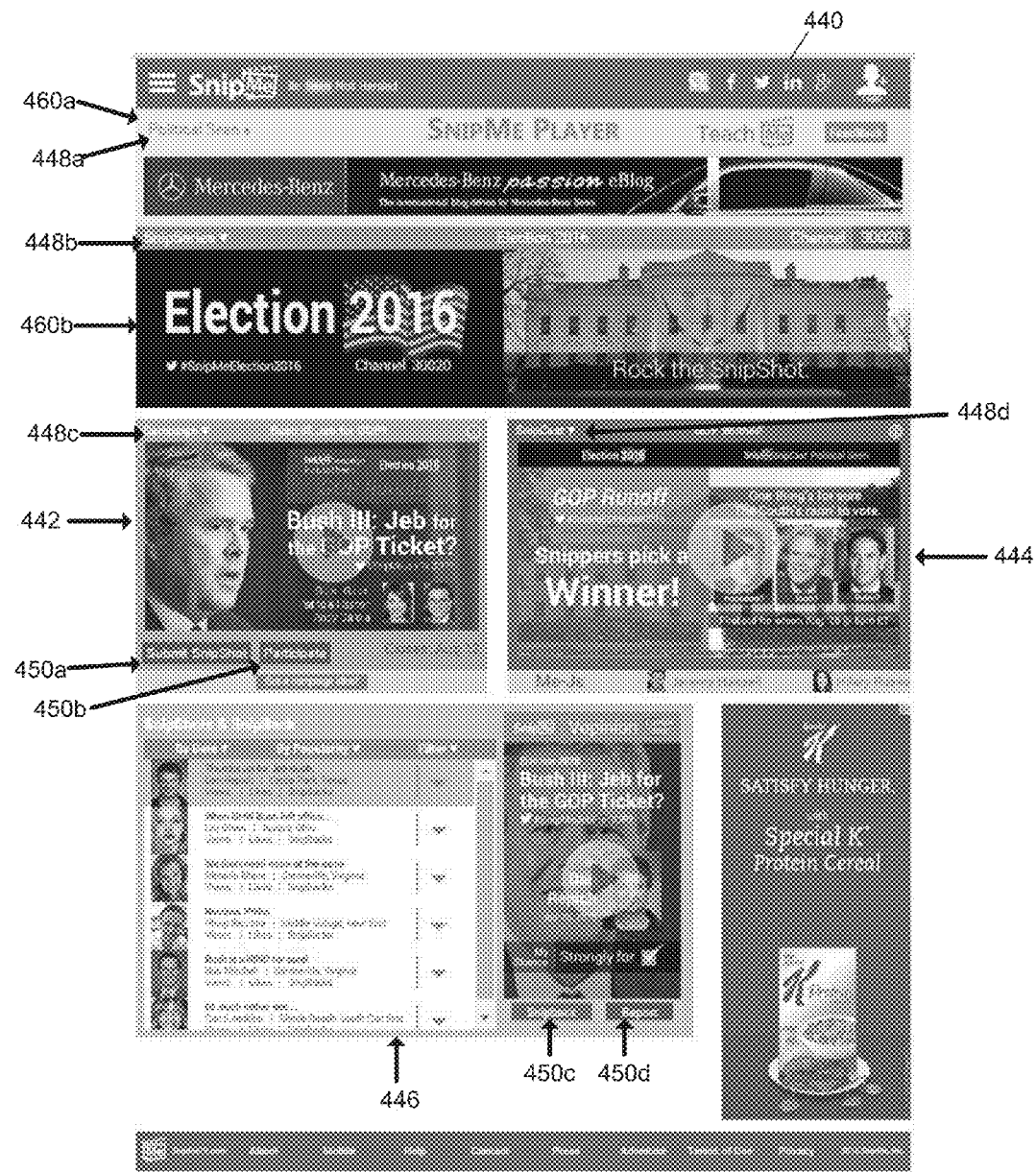
Figure 7C:
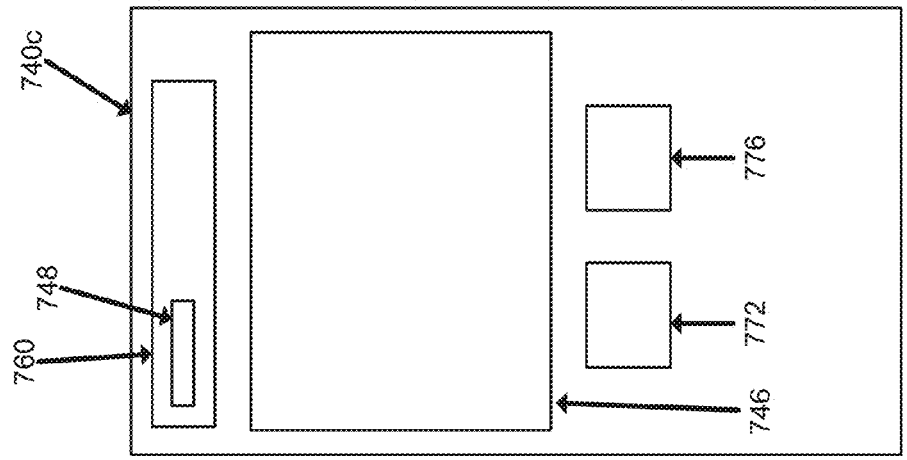
FIGS. 7A-7C are graphical representations of a user interface of the media player according to an embodiment.
Figure 7B:
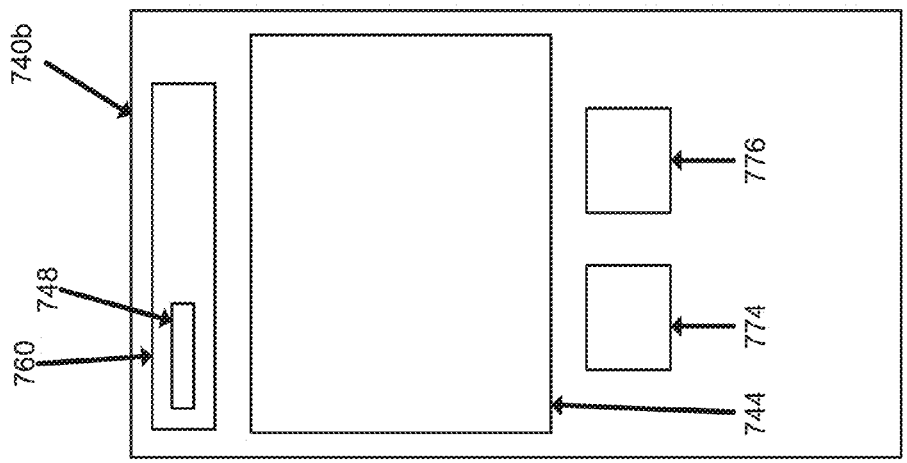
Figure 7A:
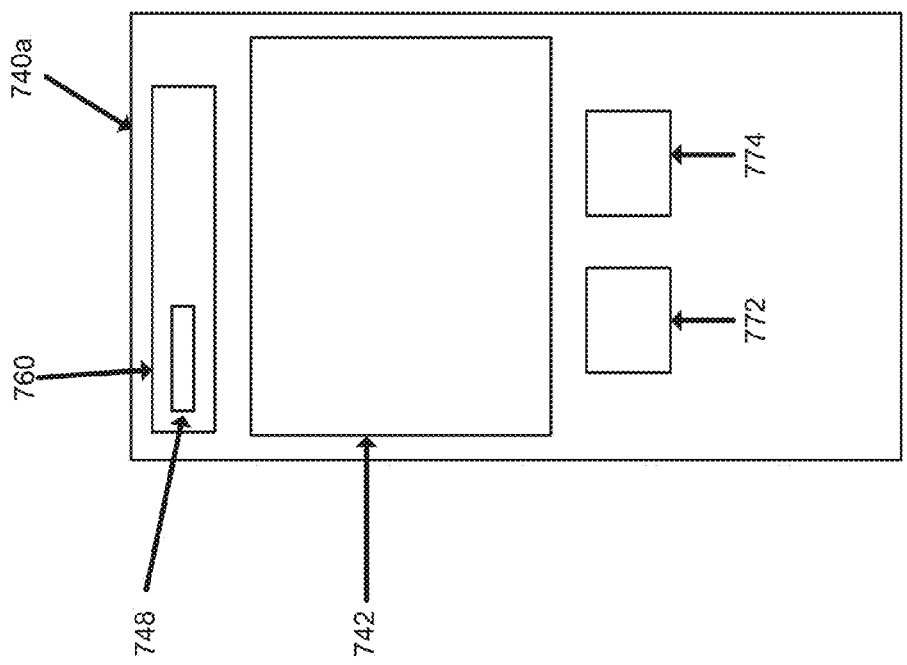

FIG. 4 is a block diagram depicting a compute device 202 including a processor 212 configured to execute a media player application 208. Compute device 202 can be similar to and include similar components as compute device 102. FIGS. 5A-5C are graphical representations of a user interface for, and an output of, a media player ("media player") 440 defined by the media player application 208. The media player application 208 can include software modules and/or code that can include instructions to cause a processor to simultaneously display at least two linked media sources. In some embodiments, the media player application 208 can be a native application on a desktop and/or mobile computing device. In some embodiments, can be a web (browser) based application. As shown in FIG. 4, the media player application 208 includes a display module 230 and a selection module 232. As shown in FIG. 5A, media player 440 includes a first multimedia stream user interface and output portion ("first multimedia stream") 442, a second multimedia stream user interface and output portion ("second multimedia stream") 444 and a third multimedia stream user interface and output portion ("third multimedia stream") 446.

The media player application 208 includes the display module 230 that can be configured send signals configured to cause a display (not shown) of compute device 202 to render a graphical representation of user interface for and output of a media player, for example, media player 440. The media player application 208 includes the selection module 232 that can be configured to receive signals indicative of a selection by a user of a compute device. In some embodiments, the selection can be a selection of a multimedia presentation, a campaign request, a category or subcategory of multimedia presentations and/or campaigns, etc. The selection module 232 can be configured to communicate with the display module 230 to cause the compute device 202 to display the media player 440 that then displays both content selected as well as additional content linked to the selected content, as described herein.

The media player 440 can include different portions that display different streams of multimedia content. As shown in FIG. 5A, the media player 440 includes the first multimedia stream 442, the second multimedia stream 444, and the third multimedia stream 446. Furthermore, and as shown in FIG. 5A, the media player 440 displays a representation of at least one menu selector 448a-448d and at least one interactive buttons 450a-d. Each menu selector can be associated with a multimedia category, multimedia sub-category, and/or a media stream, and each multimedia category, multimedia sub-category, and/or a media stream can be interrelated via one or more relationship indicators.

By way of example, multimedia categories can include "Entertainment," "Politics," "Financial," etc, and each multimedia category can be associated with a unique category identifier. Multimedia subcategories, for example for the "Entertainment" category, can include "Movies," "Television," etc. Each multimedia subcategory can be associated with a unique subcategory identifier. Similarly, each piece of content associated with each media stream can be associated with a unique identifier. Finally, and as discussed above, each multimedia category, multimedia sub-category, and/or a media stream can be interrelated via one or more relationship indicators, specifically by sharing the various indicators as described herein.

Similarly, each interactive button can be associated with an action. For example, submitting a response to a campaign request (interactive button 450a), participate in a campaign (interactive button 450b), respond to a video response (interactive button 450c), and report a video response (or response to a video response) as offensive (interactive button 450d). In some embodiments, additional and/or different interactive buttons can be associated with one or more of the first multimedia stream 442, the second multimedia stream 444, and the third multimedia stream 446, for example, voting and/or otherwise indicative an opinion or position, etc.

Each of the first multimedia stream 442, the second multimedia stream 444, and the third multimedia stream 446, can be associated with a type of linked content. By way of example, the first multimedia stream 442 can display a campaign request video; the second multimedia stream 444 can display a multimedia presentation including video responses to the campaign request video currently being presented by the first multimedia stream; and the third multimedia stream can display video responses to the campaign request video currently being presented by the first multimedia stream, responses to the video responses (and responses to responses). In such an example, the campaign request video can include (1) a multimedia category identifier, (2) a multimedia subcategory identifier, (3) a request identifier and (4) one or more multimedia presentation identifiers. In such an example, when a user selects the campaign request video, for example, via menu selector 448c, media player application 208 can analyze the multimedia category identifier, the multimedia subcategory identifier, and the request identifier, and can cause a multimedia output to display media player 440 such that (1) category display portion 460a displays a graphical representation of the multimedia category associated with the multimedia category indicator, (2) subcategory display portion 460b displays a graphical representation of the multimedia subcategory associated with the multimedia subcategory indicator, (3) the first multimedia stream 442 displays the campaign request video, (4) the second multimedia stream 444 displays a multimedia presentation including video responses to the campaign request video, and (5) the third multimedia stream can display video responses to the campaign request video currently being presented by the first multimedia stream.

When a user selects any of a different multimedia category, multimedia subcategory, campaign request video, multimedia presentation, or video response, any one of category display portion 460a, subcategory display portion 460b, the first multimedia stream 442, the second multimedia stream 444, and the third multimedia stream 446, can change, as appropriate, based on the indicators/identifiers associated with a particular selection. By way of example, as shown in FIG. 5A, the media player application 208 has loaded the campaign request video titled "Huckabee for GOP?" as shown in the first multimedia stream 442. This could have been loaded based on a user selection of that campaign request video via, for example, menu selector 448c, a link in a social media feed, etc. As shown in FIG. 5B, a user can interface with menu selector 448c to cause media player 440 to display a drop down menu including, for example, a campaign for "Bush III: Jeb for GOP?", which a user can select. Upon selection of that campaign, and as shown in FIG. 5C, media player 440 displays new content in first multimedia stream 442, and third multimedia stream 446. In this example, the content displayed in second multimedia stream 444, "GOP Winner!", has a relationship with both the "Huckabee for GOP?" campaign, as well as the "Bush III: Jeb for GOP?" and therefore may not change.

In some embodiments, the first multimedia stream 442, the second multimedia stream 444, and the third multimedia stream 446 include an image (for example a static image) from a piece of content associated with a particular multimedia stream. By way of example, first multimedia stream 442 can be associated with a campaign request video as described herein, and can display an image from the campaign request video. In such an example, a user can click or otherwise select the image to play the campaign request video. In such an example, when a user is playing one of the first multimedia stream 442, the second multimedia stream 444, and the third multimedia stream 446, the other of the first multimedia stream 442, the second multimedia stream 444, and the third multimedia stream 446 can continue to display respective static images, interactive buttons, polls, etc. Said another way, interacting with the user interface and output of one particular multimedia stream may not reformat the user interface and output of media player 440. In some embodiments, while interacting with the user interface and output of one particular multimedia stream may not reformat the user interface and output of media player 440, such interaction can affect one or more particular multimedia streams. In such an embodiment, and by way of example, initiating one multimedia stream can pause an active, i.e., currently playing, multimedia stream. In another such example, a user can opt to view any one of the multimedia streams in a full-screen mode. In such an example, switching to and/or from full screen mode can return the media player 440 to a previous context.

As described above, multimedia categories, multimedia subcategories, campaign request videos, multimedia presentations of video responses, video response not included in multimedia presentations, and also responses to the video responses can be linked and or otherwise related, for example using identifiers (relationship indicators). These elements can be linked via, one-to-many relationships, many-to-many relationships, and one-to-one relationships. By way of example, with respect to a one-to-many relationship, one multimedia category can be related to many multimedia subcategories (Entertainment can be related to Movies, Television, Literature, etc). Similarly, one multimedia subcategory can be related to many multimedia presentations (Movies can be related to a weekly movie review presentation as well as a weekly box office presentation). By way of example, with respect to a many-to-many relationship, each campaign request video can be related to many multimedia presentations, and each multimedia presentation can be related to many campaign request videos (weekly movie review presentation can be related to both a request for reviews on a first movie and also a request for review of a second movie, and the request for reviews on the first movie can be related to both the weekly movie review presentation and also a special on the first movie). By way of example, with respect to a one-to-one relationship, typically, a video response is only related to a single campaign request video, and a response to a video response (and responses to the response) is typically only related to the content to which the response is responding.

Media player application 208, and any of first multimedia stream 442, the second multimedia stream 444, and/or the third multimedia stream 446, can be launched in a number of different manners. In some instances, a user of compute device 202 can open media player application 208. In such a manner, media player application 208 can launch, and can load a category, subcategory, etc., based on, for example, a user profile, recently viewed multimedia, etc. In another instance, a user of compute device 202 can click on a link to any of the three multimedia streams, for example, clicking on a campaign request video, via, for example an email, embedded web link, social media sharing mechanism, etc., or directly from a listing of shows or active campaigns in the company's website or mobile application. In such an instance, media player application 208 can display the media player 440 and can load the category, subcategory, etc., based on the relationship indicators associated with the link that was clicked.

While shown in FIG. 5A as a single media player simultaneously displaying three multimedia streams, a media player application can be provided in different "skins" or ways of viewing the video streams. This may be based on either the user's preferences or on the capabilities of a compute device. In the case of user preferences, for example, a user may prefer to see one larger player and use menus to navigate between the three multimedia streams. In the case of the capabilities of the device, a larger and/or higher resolution screens can allow all of the elements on a single screen as shown in the FIG. 5A. On smaller and/or lower resolution screens, such as mobile devices, the multimedia streams are linked but can be navigated to through one or more taps/clicks but that are otherwise still linked using the relationship identifiers.

By way of example, a single media player can simultaneously display less than three multimedia streams (see, e.g., FIGS. 6A-6B and 7A-7C). In one such embodiment, a media player can include, for example, a first page 640a and a second page 640b that include a category display portion 660 and a menu selector 648. In such an embodiment, the first page 640a can simultaneously display a first multimedia stream 642 and a second multimedia stream 644 and include a link 672 to the second page, and the second page 640b can display a third multimedia stream 646 and a link 674 to the first page (see FIGS. 6A-6B). In another such embodiment, a media player can include, for example a first page 740a, a second page 740b and a third page 740 that include a category display portion 760 and a menu selector 748. The first page 740a includes a link 772 to second page 740b and a link 774 to the third page 740c, the second page 740b includes the link 774 to the third page 740c and a link 776 to the first page 740a, and the third page 740c includes the link 772 to second page 740b and the link 776 to the first page 740a. In such an embodiments, first page 740a can display a first multimedia stream 742, the second page 740b can display a second multimedia stream 744, and the third page 740c can display a third multimedia stream 746.

FIGS. 8A and 8B depict tables that can be included in a database operatively coupled to a media player application. As shown in FIG. 8A, a table 880 including a title column 882, a user ID column 884 and a campaign ID column 886; and as shown in FIG. 8B a table 890 includes a title column 892, a campaign ID column 894 and a multimedia presentation ID column 896. While shown and described as having a particular number and type of column, on other embodiments, either of table 880 and/or table 890 can include more, fewer and/or different combinations of columns including different relationship identifiers. In one example with reference to FIGS. 8A and 8B, a user can select to view Campaign Request 1. In such an example, the media player application can identify the Campaign ID of Campaign Request 1 as "ABCD," and can cause a processor to cause a user interface and display of a media player ("media player") to be displayed, specifically, to cause (1) at least one image from Campaign Request 1 video to be displayed in a first portion of the media player, (2) at least one image from either multimedia presentation 98AB or multimedia presentation 76DE to be displayed in a second portion of the media player (based on the link between Campaign ID ABCD and Multimedia Presentation IDs 98AB and 76DE in table 890 as shown in FIG. 8B), and (3) at least one image from Response Video 1 or Response Video 2 to be displayed in a third portion of the media player (based on the links between Campaign ID ABCD and Response Video 1 and Response Video 2 in table 880 as shown in FIG. 8A).

As described herein, it is apparent that the two or more multimedia streams are directly linked via relationship indicators, for example, common identifiers. In contrast, the two or more multimedia streams are not merely linked based on having a common user/uploader, or common search terms. For example, and with reference to FIGS. 5A-5C and FIGS.

8A and 8B, "Huckabee for GOP?" is Campaign Request 1, "Bush III: Jeb for GOP?" is Campaign Request 2, and "GOP Winner!" is multimedia presentation 98AB. In this example, "Huckabee for GOP?" and "Bush III: Jeb for GOP?" may not be discoverable via common search terms, but rather, via the relationship identifiers. Said another way, when a user selects "Huckabee for GOP?", "GOP Winner!" is displayed in the second media stream because table 890 indicates a direct relationship between Campaign Request 1 and Multimedia Presentation ID 98AB, and not because "Huckabee for GOP?" and "GOP Winner!" include common text based search terms, not because they are commonly watched together, and not because of other similar indirect relationships. Similarly, when a user is currently viewing "Huckabee for GOP?" and selects "Bush III: Jeb for GOP?" for viewing, the user interfaces and graphical representations of a media player change, or don't change, based on the relationship indicators, but not based on the indirect relationships as described above.

While generally described herein with respect to a campaign request video, in some embodiments, a campaign request can be a text, imagine and/or otherwise a non-video request, e.g., email, social media post, etc. In such embodiments, an output of a media player as described herein may not include a multimedia stream associated with the campaign request but instead can include text and/or an image representative of the campaign request, and/or may only display two multimedia streams, for example, the media player 440 from FIG. 5A, but without multimedia stream 442. In such an embodiment, a campaign request can still be associated with a campaign request ID; multimedia presentations, video responses, and responses to responses can still be interrelated using that campaign request ID. Similarly, in some embodiments, a campaign, with or without a campaign video request can be closed after a certain period of time. In such embodiments, a media player may or may not include a multimedia stream associated with a campaign request video as described above.

A media player application as described herein can include a link that automatically opens up a second, related program used for content creation, e.g., producing videos responses. For example, after a user of a compute device watches the campaign/topic request video, the user can be presented with a request to produce a video responsive to the topic request. If the user accepts the request, they can be taken directly into the video production application, which will automatically associate the video that the user records with the campaign based on the user having accepted the request via the first video source in the media player. If that user's video is approved, it will be included in the feed for the third video source and be considered for inclusion in a future created multimedia presentation for the first video source. Such content creation applications are disclosed in Ser. No. 14/706,934, entitled "Multi-Media Content Creation Application" filed on even date herewith, which is incorporated herein by reference in its entirety.

While generally described with respect to news programs (politics, entertainment, etc.), the media player can also be used as a self-service platform. For example, the media player can be used to show videos associated with a wedding, other party or celebration, internal business promotion, product testimonial, corporate survey, employment application, etc. In such an example, a user can produce a request for videos (first video source) for a selected group of users. The request can be to tell a story about the bride and/or groom. All and/or approved video can be viewable via one of the multimedia streams. And finally a user, or a third part professional producer, can prepare and present the final wedding video (multimedia presentation) that includes selected videos submitted in response to the request.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. A method, comprising:
   receiving, at a mobile device, an indication of a user selection of a multimedia presentation, the multimedia presentation including a presentation identifier that is linked to at least one video request identifier;
   selecting (1) a video request from a plurality of video requests based on the video request being linked to the at least one video request identifier, and (2) a multimedia category from a plurality of multimedia categories based on the multimedia category being linked to the at least one video request identifier;
   sending a signal to cause the mobile device to display, at a time, (1) a first portion of a user interface of a media player including at least one image from the multimedia presentation; (2) a second portion of the user interface of the media player including at least one image from the video request; and (3) a third portion of the user interface of the media player including an image representative of the multimedia category.

2. The method of claim 1, wherein the time is a first time, the method further comprising sending a signal to cause the mobile device to display at a second time after the first time, a fourth portion of the user interface of the media player including at least one image from a video response that includes the at least one video request identifier.

3. The method of claim 1, wherein:
receiving the indication of the user selection includes receiving the indication of the user selection from a first mobile device application; and
sending a signal to cause the mobile device to display the first portion of the user interface of the media player includes sending a signal to cause the mobile device to display the first portion of the user interface of the media player in a second mobile device application different from the first mobile device application.

4. The method of claim 1, wherein:
receiving the indication of the user selection includes receiving the indication of the user selection from a network browser; and
sending a signal to cause the mobile device to display the first portion of the media player includes sending a signal to cause the mobile device to display the first portion of the user interface of the media player in the network browser.

5. The method of claim 1, further comprising:
sending a signal to cause the mobile device to display, at the time, in the first portion of the user interface of the media player, an overlay including a menu including a list of multimedia presentations associated with the multimedia category.

6. The method of claim 1, further comprising:
sending a signal to cause the mobile device to display, at the time, in the second portion of the user interface of the media player, an overlay including a menu including a list of video requests associated with one or more multimedia categories.

7. The method of claim 1, wherein the multimedia presentation is a first multimedia presentation, the multimedia category is a first multimedia category, the video request is a first video request, and the time is a first time, the method further comprising:
receiving, after the first time at the mobile device, an indication of a user selection of a second multimedia category;
sending a signal to cause the mobile device to display, at a second time after the first time, the first portion of a user interface of the media player including a second multimedia presentation; and
sending a signal to cause the mobile device to display, at the second time, the second portion of the user interface of the media player including at least one image from a second video request associated with the second multimedia presentation.

8. The method of claim 1, wherein at least one of the first portion of the user interface of the media player or the second portion of the user interface of the media player further includes a plurality of interactive buttons.

9. An apparatus, comprising:
an application module implemented in a memory, the application module, when operational, receiving, at a compute device, an indication of a user selection of a multimedia presentation, the multimedia presentation including a presentation identifier that is linked to a video request identifier;
the application module, when operational, causing a display to display, during a first time period and at the compute device, (1) a first portion of a user interface of a media player, the first portion including the multimedia presentation, and (2) a first link associated with a second portion of the user interface of the media player;
the application module, when operational, causing the display to display, during a second time period different from the first time period and at the compute device, (1) a second link associated with the first portion of the user interface of the media player and (2) the second portion of the user interface of the media player, the second portion including a video request that is associated with the multimedia presentation and that includes the video request identifier.

10. The apparatus of claim 9, wherein the application module, when operational, causing the display to display at the compute device, (1) during at least one of the first time period or the second time period, a third link associated with a third portion of the user interface of the media player, and (2) during a third time period after the second time period, the third portion of the user interface of the media player including a video response including the video request identifier.

11. The apparatus of claim 9, wherein the application module when operational, causing the display to display at the compute device, a fourth portion of the user interface of the media player including a multimedia category associated with the video request and with the multimedia presentation.

12. The apparatus of claim 9, wherein the second portion of the user interface of the media player further includes a plurality of interactive buttons.

13. The apparatus of claim 9, wherein:
the application module, when operational, receiving the indication of the user selection from a first mobile device application; and
the application module, when operational, causing the display to display the first portion of the user interface of the media player in a second mobile device application different from the first mobile device application.

14. The apparatus of claim 9, wherein the application module, when operational, during the first time period, pre-loading without displaying, the second portion of the user interface of the media player.

15. The apparatus of claim 11, wherein:
the multimedia presentation is a first multimedia presentation, the multimedia category is a first multimedia category, the video request is a first video request,
the application module, when operational, receiving, after the second time period at the compute device, an indication of a user selection of a second multimedia category;
the application module, when operational, causing the display to display, after the second time period and at the compute device, (1) the first link, and (2) the second portion of the user interface of the media player including a second video request that is associated with the second multimedia presentation.

16. A non-transitory processor-readable medium storing code representing instructions to be executed by a processor, the code comprising code to cause the processor to:
receive, at a compute device, an indication of a user selection of a multimedia presentation, the multimedia presentation including a presentation identifier that is linked to a video request identifier;

select a video request from a plurality of video requests based on the video request being linked to the video request identifier, and (2) a video response from a plurality of video responses based on the video response being linked to the video request identifier;

send a signal to cause the compute device to display at a time (1) a first portion of a user interface of a media player including at least one image from the multimedia presentation; (2) a second portion of the user interface of the media player including at least one image from a video request; and (3) a third portion of the user interface of the media player including at least one image from a video response including the video request identifier.

17. The non-transitory processor-readable medium of claim 16, wherein the multimedia presentation includes at least one interactive button.

18. The non-transitory processor-readable medium of claim 17, further storing code representing instructions to be executed by the processor, the code comprising code to cause the processor to receive, in response to a manipulation of the at least one interactive button, a indication of a vote selection associated with the video request.

19. The non-transitory processor-readable medium of claim 16, wherein the video response is included in a plurality of video responses, each video response from the plurality of video responses including the video request identifier, the non-transitory processor-readable medium further storing code representing instructions to be executed by the processor, the code comprising code to cause the processor to send a signal to cause the compute device to display at the time, a fourth portion of the user interface of the media player including a list of the plurality of video responses.

20. The non-transitory processor-readable medium of claim 16, further storing code representing instructions to be executed by the processor, the code comprising code to cause the processor to:

receive the indication of the user selection from a first mobile device application; and send a signal to cause the compute device to display the first portion of the user interface of the media player in a second mobile device application different from the first mobile device application.

21. The non-transitory processor-readable medium of claim 16, further storing code representing instructions to be executed by the processor, the code comprising code to cause the processor to send a signal to cause the compute device to display, at the time, in the first portion of the user interface of the media player, an overlay including a menu including a list of multimedia presentations associated with a multimedia category.

22. The non-transitory processor-readable medium of claim 16, further storing code representing instructions to be executed by the processor, the code comprising code to cause the processor to send a signal to cause the compute device to display, at the time, in the second portion of the user interface of the media player, an overlay including a menu including a list of video requests associated with a multimedia category.

23. The non-transitory processor-readable medium of claim 16, wherein the multimedia presentation is a first multimedia presentation, the video request is a first video request, the video response is a first video response, and the time is a first time, further storing code representing instructions to be executed by the processor, the code comprising code to receive, at a compute device, an indication of a user selection of a second multimedia presentation, the second multimedia presentation including a second presentation identifier that is linked to a second video request identifier;

select a second video request from the plurality of video requests based on the second video request being linked to the second video request identifier, and (2) a second video response from the plurality of video responses based on the second video response being linked to the second video request identifier;

send a signal to cause the compute device to display, at a second time after the first time, (1) the first portion of a user interface of the media player including at least one image from the second multimedia presentation; (2) the second portion of the user interface of the media player including at least one image from the second video request; and (3) the third portion of the user interface of the media player including at least one image from the second video response including the second video request identifier.

\* \* \* \* \*